(12) United States Patent
Lu et al.

(10) Patent No.: US 12,106,485 B2
(45) Date of Patent: Oct. 1, 2024

(54) EDGE-GUIDED HUMAN EYE IMAGE ANALYZING METHOD

(71) Applicant: Beihang University, Beijing (CN)

(72) Inventors: Feng Lu, Beijing (CN); Yuxin Zhao, Beijing (CN); Zhimin Wang, Beijing (CN); Qinping Zhao, Beijing (CN)

(73) Assignee: Beihang University, Beijing (CN)

( * ) Notice: Subject to any disclaimer, the term of this patent is extended or adjusted under 35 U.S.C. 154(b) by 424 days.

(21) Appl. No.: 17/729,839

(22) Filed: Apr. 26, 2022

(65) Prior Publication Data

US 2022/0254031 A1    Aug. 11, 2022

(30) Foreign Application Priority Data

Sep. 24, 2021    (CN) .......................... 202111121554.3

(51) Int. Cl.
*G06T 7/12*    (2017.01)
*G06V 40/18*    (2022.01)

(52) U.S. Cl.
CPC .............. *G06T 7/12* (2017.01); *G06V 40/193* (2022.01); *G06T 2207/20084* (2013.01); *G06T 2207/30201* (2013.01)

(58) Field of Classification Search
CPC .............. G06T 7/12; G06T 2207/20084; G06T 2207/30201; G06T 2207/20081; G06V 40/193; G06V 10/26; G06V 10/454; G06V 10/82; G06N 3/045; G06N 3/08
USPC ......................................................... 382/103
See application file for complete search history.

(56) References Cited

U.S. PATENT DOCUMENTS

2018/0089834 A1*    3/2018   Spizhevoy ............. G06V 10/56

* cited by examiner

*Primary Examiner* — Stephen P Coleman

(57) ABSTRACT

The embodiments of the present disclosure disclose an edge-guided human eye image analyzing method. A specific implementation of this method comprises: collect a human eye image as an image to be detected; obtain a human eye detection contour map; obtain a semantic segmentation detection map and an initial human eye image detection fitting parameter; performing an iterative search on the initial human eye image detection fitting parameter to determine a target human eye image detection fitting parameter; sending the semantic segmentation detection map and the target human eye image detection fitting parameter as image analyzing results to a display terminal for display. This implementation improves the accuracy at the boundary dividing the pupil-iris area, and increases the structural integrity of the ellipse resulted from dividing the pupil-iris area. In addition, the iterative search can achieve a more accurate ellipse parameter fitting result.

10 Claims, 5 Drawing Sheets

EDGE-GUIDED HUMAN EYE IMAGE ANALYZING METHOD

CROSS-REFERENCE TO RELATED APPLICATION

The present application is based on, and claims priority from, Chinese application number CN202111121554.3, filed Sep. 24, 2021, the disclosure of which is hereby incorporated by reference herein in its entirety.

TECHNICAL FIELD

The embodiments of the present disclosure relate to the technical field of image analysis, and in particular, to an edge-guided human eye image analyzing method.

BACKGROUND OF THE INVENTION

Gaze tracking technology refers to technology that estimates the user's gaze. It provides an efficient human-computer interaction method for the fields of virtual reality and augmented reality, and is applied more and more widely at present. Human eye image analyzing methods are roughly divided into two categories: traditional methods and deep learning-based methods. There are some problems with the existing methods. On the one hand, the dividing line between the sclera and iris in near-eye images is extremely indistinct, and is affected by changing illumination, corneal refraction, etc. When doing semantic segmentation maps, the boundaries of the images are often quite rough, and at the same time, it is also difficult to guarantee the integrity of the regional elliptical structure. On the other hand, the methods may misjudge certain distractors in the images as pupil and iris areas, for example, the corners of the eyes, the nose pads of glasses, and scenes reflected by glasses, etc.

SUMMARY OF THE INVENTION

The content of the present disclosure is to introduce concepts in a brief form, and these concepts will be described in detail in the following section of the detailed description of the invention. The content of the present disclosure is not intended to identify the key features or essential features of the claimed technical solution, nor is it intended to limit the scope of the claimed technical solution.

Some embodiments of the present disclosure propose an edge-guided human eye image analyzing method to solve one or more of the technical problems mentioned in the above background section.

Some embodiments of the present disclosure provide an edge-guided human eye image analyzing method, the method comprises: using a camera to collect a human eye image as an image to be detected, wherein the image to be detected includes at least one of the following: a pupil area, an iris area, an upper eyelid area, and a lower eyelid area; inputting the image to be detected to a pre-trained contour generation network to obtain a human eye detection contour map; inputting the image to be detected and the human eye detection contour map to a pre-trained edge-guided analyzing network to obtain a semantic segmentation detection map and an initial human eye image detection fitting parameter; based on the semantic segmentation detection map, performing an iterative search on the initial human eye image detection fitting parameter to determine a target human eye image detection fitting parameter; sending the semantic segmentation detection map and the target human eye image detection fitting parameter as image analyzing results to a display terminal for display.

According to the above practical requirements and technical difficulties, the purpose of the present invention is to propose an edge-guided human eye image analyzing method. The method takes a human eye image as input, and guides the analyzing process by extracting the image contour information of the upper and lower eyelids, pupil and iris in the image, so as to guarantee the structure integrity and the boundary accuracy of the pupil-iris area dividing ellipse. By synthesizing the pupil-iris area dividing results, a more accurate parametric representation of the pupil-iris ellipse is obtained. That is, the method finally achieves the division of the pupil-iris area of the human eye and obtains the ellipse parameters (ellipse center, long and short semi-axis, and rotation angle). The above embodiments of the present disclosure have the following beneficial effects: (1) Improved accuracy at the boundary dividing the pupil-iris area. With the key contour information of the human eye image (upper and lower eyelids, pupil and iris), the smoothness and accuracy at the boundary are improved. (2) Increased structural integrity of the ellipse resulted from dividing the pupil-iris area. With the guidance of key contour information, the cases of missing or redundant parts of elliptical area are reduced. (3) Comprehensively integrated the pupil-iris area division and parameter fitting results. With the pixel-level pupil-iris area division results, more accurate ellipse parameter fitting results are obtained by an iterative search.

BRIEF DESCRIPTION OF THE DRAWINGS

The above and other features, advantages, and aspects of the embodiments of the present disclosure will become more apparent in conjunction with the accompanying drawings and with reference to the following embodiments. Throughout the drawings, the same or similar reference signs indicate the same or similar elements. It should be understood that the drawings are schematic, and the components and elements are not necessarily drawn to scale.

DETAILED DESCRIPTION OF THE INVENTION

Figure 1:
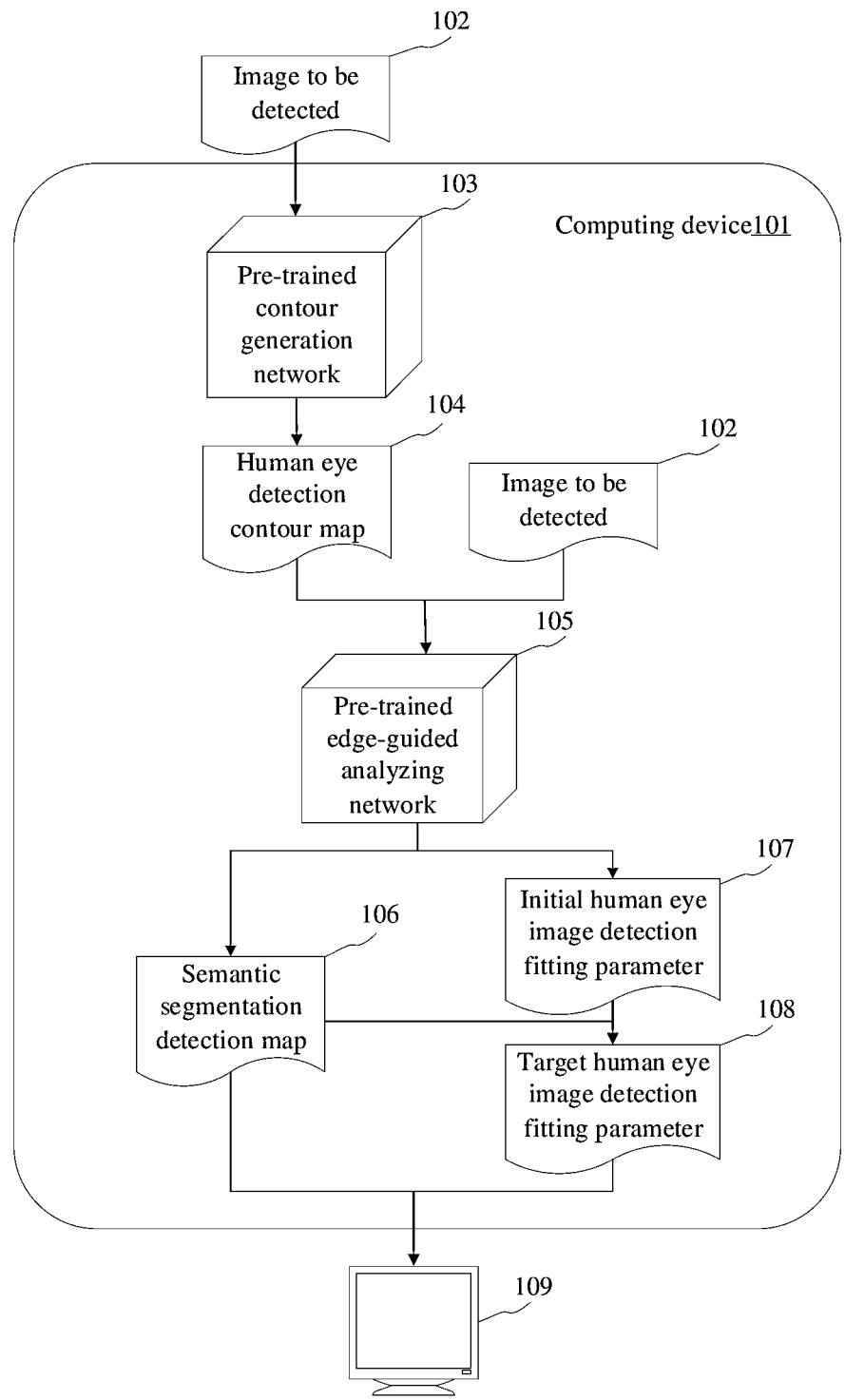
FIG. 1 is a schematic diagram of the application scenario of an edge-guided human eye image analyzing method according to some embodiments of the present disclosure.

Hereinafter, the embodiments of the present disclosure will be described in more detail with reference to the accompanying drawings. Although certain embodiments of the present disclosure are shown in the drawings, it should be understood that the present disclosure can be implemented in various forms, and shall not be construed as being limited to the embodiments set forth herein. On the contrary, these embodiments are provided for a more thorough and complete understanding of the present disclosure. It should be understood that the drawings and embodiments of the present disclosure are used only for illustrative purposes, not to limit the protection scope of the present disclosure.

Besides, it should be noted that, for ease of description, only the portions related to the relevant invention are shown in the drawings. In the case of no conflict, the embodiments in the present disclosure and the features in the embodiments can be combined with each other.

It should be noted that such concepts as "first" and "second" mentioned in the present disclosure are only used to distinguish different devices, modules or units, not to limit the order of functions performed by these devices, modules or units, or the interdependence therebetween.

It should be noted that such adjuncts as "one" and "more" mentioned in the present disclosure are illustrative, not restrictive, and those skilled in the art should understand that, unless the context clearly indicates otherwise, they should be understood as "one or more".

The names of messages or information exchanged between multiple devices in the embodiments of the present disclosure are only used for illustrative purposes, not for limiting the scope of these messages or information.

Hereinafter, the present disclosure will be described in detail with reference to the drawings and in conjunction with the embodiments.

FIG. 1 is a schematic diagram of the one application scenario of an edge-guided human eye image analyzing method according to some embodiments of the present disclosure.

In the application scenario of FIG. 1, firstly, a computing device 101 uses a camera to collect a human eye image as an image to be detected 102, wherein the image to be detected 102 includes at least one of the following: a pupil area, an iris area, an upper eyelid area, and a lower eyelid area. Then, the computing device 101 may input the image to be detected 102 to a pre-trained contour generation network 103 to obtain a human eye detection contour map 104. Afterwards, the computing device 101 may input the image to be detected 102 and the human eye detection contour map 104 to a pre-trained edge-guided analyzing network 105 to obtain a semantic segmentation detection map 106 and an initial human eye image detection fitting parameter 107. Next, the computing device 101 may perform an iterative search on the initial human eye image detection fitting parameter 107 based on the semantic segmentation detection map 106, to determine a target human eye image detection fitting parameter 108. Finally, the computing device 101 may send the semantic segmentation detection map 106 and the target human eye image detection fitting parameter 108 as image analyzing results to a display terminal 109 for display.

It should be noted that the above computing device 101 may be hardware, or software. When the computing device is hardware, it may be implemented as a distributed cluster composed of multiple servers or terminal devices, or may be implemented as a single server or a single terminal device. When the computing device is embodied as software, it may be installed in the hardware devices listed above. It can be implemented, for example, as multiple software or software modules for providing distributed services, or as a single software or software module. No specific limitation is made here.

It should be understood that the number of computing devices in FIG. 1 is merely illustrative. There may be any number of computing devices depending on the needs for implementation.

Figure 2:
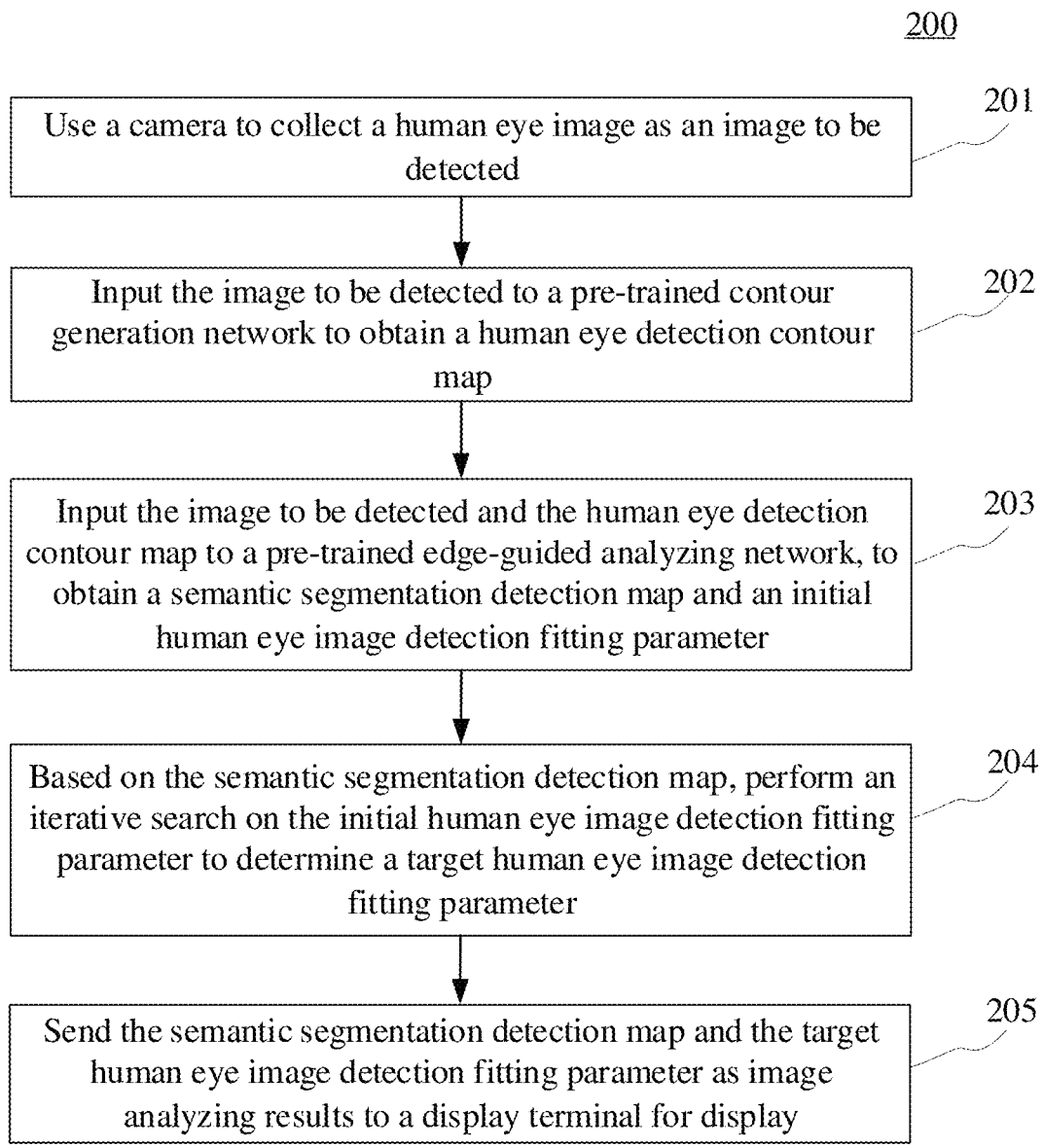
FIG. 2 is a flowchart of some embodiments of the edge-guided human eye image analyzing method according to the present disclosure.

Continue to see FIG. 2, a flow 200 of some embodiments of the edge-guided human eye image analyzing method according to the present disclosure. The edge-guided human eye image analyzing method includes the following steps:

Step 201, use a camera to collect a human eye image as an image to be detected.

Figure 3:
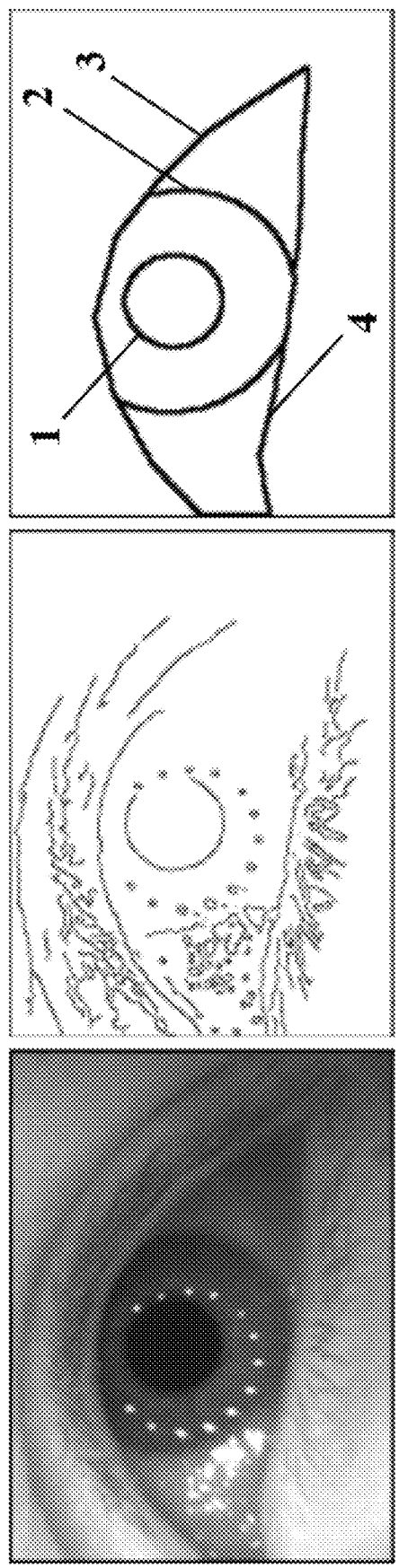
FIG. 3 is a schematic diagram of a human eye image according to the present disclosure.

In some embodiments, the executive body of the edge-guided human eye image analyzing method (such as the computing device 101 shown in FIG. 1) may use a camera to collect a human eye image as an image to be detected. Wherein, the image to be detected may include, but is not limited to, at least one of the following: pupil area, iris area, upper eyelid area, and lower eyelid area, for example, the human eye image on the left side of FIG. 3.

Gaze tracking technology needs to first calculate the gaze-related eye feature information, such as the pupil-iris center position, ellipse parameter information, etc., and use these feature information to model and solve the user gaze position. Human eye image analysis can analyze information on eyes according to the user eye images captured by devices, including the pupil-iris area division, pupil-iris ellipse parameters (ellipse center, long and short semi-axis, and rotation angle). The pupil and iris appear as a standard ellipse in the picture. In the past, many methods conducted ellipse detection on human eye pictures to fit the pupil and iris, but the robustness was fairly poor in general. With the reflection of convolutional neural networks in image processing capabilities, and the continuous expansion of datasets, in recent years, methods based on deep learning have become more and more popular. For a pupil-iris area division task, the classic semantic segmentation network U-Net in computer vision is used for segmentation; for a pupil-iris parameter fitting task, convolutional neural networks can also be used to extract features from the picture, and the features are extended and sent to a full connection layer to directly obtain an ellipse parameter result.

Step 202, input the image to be detected to a pre-trained contour generation network to obtain a human eye detection contour map.

Figure 4:
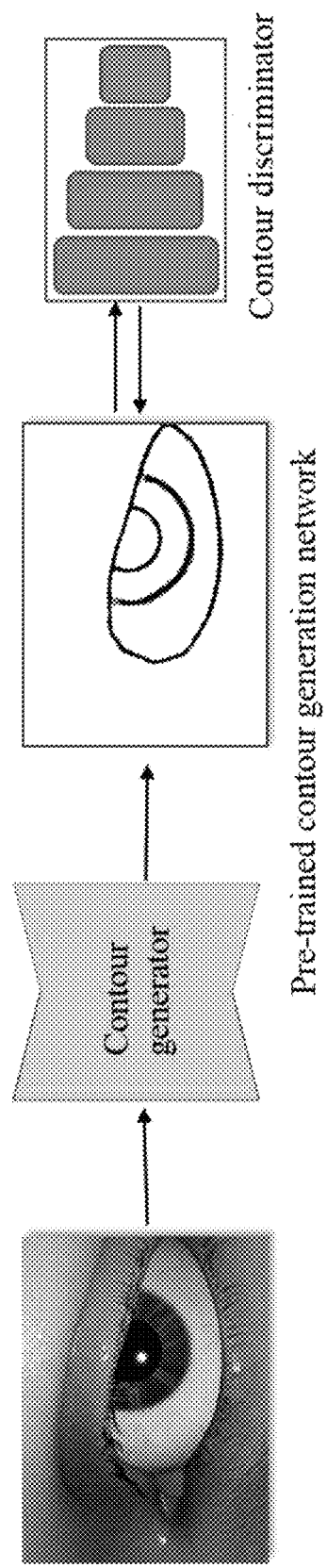
FIG. 4 is a workflow diagram of a pre-trained contour generation network according to the present disclosure.

In some embodiments, the above-mentioned executive body may input the image to be detected to a pre-trained contour generation network to obtain a human eye detection contour map. The working process of the pre-trained contour generation network is shown in FIG. 4.

Input the image to be detected to a contour generator to obtain a human eye detection contour map, and then input the human eye detection contour map to a contour discriminator for discrimination.

In certain alternative implementations of some embodiments, the above-mentioned pre-trained contour generation network can be obtained by training in the following manner:

The first step is to obtain a human eye dataset, wherein the human eye data in the human eye dataset includes human eye images and key contour labels corresponding to the human eye images;

The second step is to perform the following training steps based on the human eye dataset:

Input the human eye images included in the at least one human eye data in the human eye dataset respectively to an initial contour generator, to obtain a human eye contour map corresponding to each human eye image in the at least one human eye data. Wherein, the initial contour generator uses a bidirectional cascaded convolutional neural network. The bidirectional cascaded convolutional neural network includes a plurality of convolutional neural networks. Each convolutional neural network performs one-scale contour extraction on the image. The contours of different scales of the images extracted by multiple convolutional neural networks are fused to serve as a human eye contour map.

Determine a first loss value of the human eye contour map corresponding to the at least one human eye data, based on the key contour label corresponding to each human eye image in the above at least one human eye data and the human eye contour map corresponding to each human eye image in the above at least one human eye data.

In response to determining that the first loss value converges to a first predetermined threshold value, use the initial contour generator as a trained initial contour generator.

In response to determining that the first loss value does not converge to a first predetermined threshold, adjust the network parameters of the initial contour generator, and use an unused human eye dataset to form a training human eye dataset, use the adjusted initial contour generator as the initial contour generator, and perform the above training steps again.

Optionally, the key contour labels included in the human eye data in the human eye dataset can be obtained through the following steps:

The first step is to obtain a semantic label map. Wherein, the semantic label map may be a human eye image.

The second step is to perform edge detection on the semantic label map to obtain an image edge map. Wherein, the image edge map may include but not limited to at least one of the following: pupil edge, iris edge, upper eyelid edge and lower eyelid edge. For example, the human eye image in the middle of FIG. 3.

The third step is to perform Gaussian smoothing on at least one item included in the image edge map: the pupil edge, the iris edge, the upper eyelid edge and the lower eyelid edge, to generate a key edge map as a key contour label. For example, the human eye image on the right side of FIG. 3.

Optionally, the above determining a first loss value of the human eye contour map corresponding to the at least one human eye data, based on the key contour label corresponding to each human eye image in the at least one human eye data and the human eye contour map corresponding to each human eye image in the at least one human eye data, wherein, the first loss value of the human eye contour map corresponding to the at least one human eye data includes: a loss value of a contour generator and a loss value of a contour discriminator, may include the following steps:

The first step is to input the human eye contour map corresponding to the human eye image included in the at least one human eye data to an initial contour discriminator respectively, and obtain a first confidence value of each human eye contour map corresponding to the at least one human eye data. Wherein, the initial contour discriminator uses a convolutional neural network, and the human eye contour map is subjected to multiple convolution, pooling, and activation operations to generate a discriminant result.

The second step is to input the key contour label corresponding to the human eye image included in the at least one human eye data to the initial contour discriminator respectively, to obtain a second confidence value of each key contour label corresponding to the at least one human eye data.

The third step is to, based on the key contour label corresponding to each human eye image in the above at least one human eye data, the human eye contour map corresponding to each human eye image in the at least one human eye data, and the first confidence value of each human eye contour map in the at least one human eye data, and the second confidence value of each key contour label corresponding to the at least one human eye data, use the following formula to obtain the first loss value:

$$\begin{cases} L_G(\varepsilon) = \alpha \times \sum U(\hat{E}_i, E_i) + \beta \times \sum (D_\varepsilon(\hat{E}_i) - 1 \\ L_S(\varepsilon) = \sum (D_\varepsilon(E_i) - 1)^2 + \sum (D_\varepsilon(\hat{E}_i))^2 \end{cases}.$$

Wherein, $L_G(\varepsilon)$ represents the loss value of the contour generator with respect to $\varepsilon$, $L_G(\ )$ represents the loss value of the contour generator, $\varepsilon$ represents the parameter, $\alpha$ represents the first hyperparameter, $\Sigma$ represents the summation, $U(\hat{E}_i, E_j)$ represents the function to find the difference between the $i^{th}$ human eye contour map and the $i^{th}$ key contour label, $U(\ )$ represents the function to find the difference, i represents the serial number, $\hat{E}_i$ represents the $i^{th}$ human eye contour map, and $\hat{E}$ represents at least one human eye contour map, $E_i$ represents the $i^{th}$ key contour label, E represents at least one key contour label, $\beta$ represents the second hyperparameter, $D_\varepsilon(\hat{E}_i)$ represents the first confidence value of $\hat{E}_i$, $L_S(\varepsilon)$ represents the loss value of the contour discriminator with respect to $\varepsilon$, $L_S(\ )$ represents the loss value of the contour discriminator, and $D_\varepsilon(E_i)$ represents the second confidence value of $E_i$. Step 203: input the image to be detected and the human eye detection contour map to a pre-trained edge-guided analyzing network, to obtain a semantic segmentation detection map and an initial human eye image detection fitting parameter.

Figure 5:
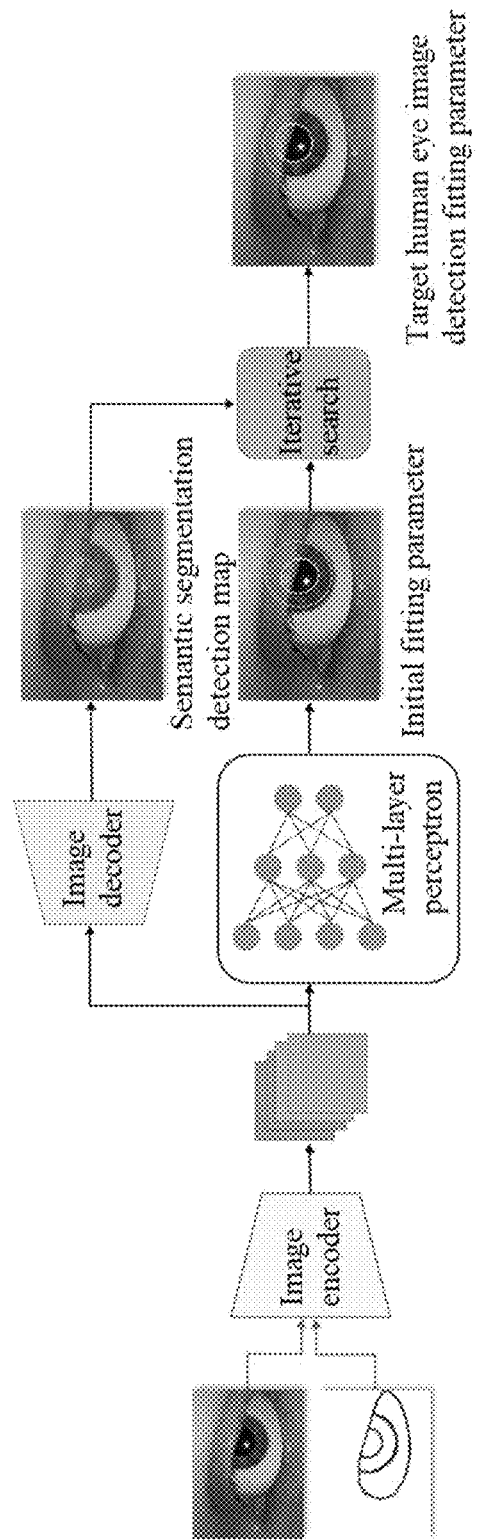
FIG. 5 is a workflow diagram of a pre-trained edge-directed analyzing network according to the present disclosure.

In some embodiments, the above-mentioned executive body may input the image to be detected and the human eye detection contour map to a pre-trained edge-guided analyzing network to obtain a semantic segmentation detection map and an initial human eye image detection fitting parameter. The working process of the pre-trained edge-guided analyzing network is shown in FIG. 5. Take the output result of the pre-trained contour generation network as a guide, input the image to be detected and the human eye detection contour map to an image decoder, to obtain an encoded image to be detected and an encoded human eye detection contour map, and then, input the encoded image to be detected to the image decoder to obtain a semantic segmentation detection map. At the same time, input the encoded human eye detection contour map to a multi-layer perceptron to obtain an initial human eye image detection fitting parameter. Perform an iterative search on the initial human eye image detection fitting parameter to determine a target human eye image detection fitting parameter.

In certain alternative implementations of some embodiments, the pre-trained edge-guided analyzing network includes: an initial image encoder, an initial image decoder, a style encoder, and a multi-layer perceptron. The pre-trained edge-guided analyzing network can be obtained by training in the following ways:

The first step is to obtain an image dataset, wherein the image data in the image dataset includes a human eye image, a human eye contour map, and a semantic segmentation map label and a human eye image fitting parameter label corresponding respectively to the human eye image and the human eye contour map, the human eye contour map included in the image data in the image dataset is a human eye contour map output by the pre-trained contour generation network;

The second step is to perform the following training steps based on the above image dataset:

Input the human eye image and the human eye contour map included in the at least one image data in the image dataset to an initial image encoder respectively, obtain the eye image feature and the human eye contour feature corresponding respectively to each human eye image and each human eye contour map in the at least one image data. Wherein, the initial image encoder is composed of a multi-layer convolutional neural network, the convolution kernel of the multi-layer convolutional neural network is continuously enlarged, and the low-level to high-level features of the picture are extracted respectively.

Perform feature fusion on the human eye image feature and the human eye contour feature corresponding respectively to each human eye image and each human eye contour map in the at least one image data, to generate fused features, and obtain a fused feature set.

Input each fused feature in the fused feature set to an initial image decoder to obtain a semantic segmentation map set. Wherein, the semantic segmentation map in the semantic segmentation map set includes a pupil area, an iris area and a skin area.

Expand and flatten each fused feature in the fused feature set and then input to a multi-layer perceptron, to obtain a human eye image fitting parameter set.

As an example, the fused feature may be $$\begin{vmatrix} 2 & 3 \\ 1 & 4 \end{vmatrix}.$$

The expanded and flattened feature may be $$\begin{vmatrix} 2 \\ 1 \\ 3 \\ 4 \end{vmatrix}.$$

Based on the semantic segmentation map label and the human eye image fitting parameter label corresponding to each human eye image and each human eye contour map respectively in the at least one image data, the semantic segmentation map set and the human eye image fitting parameter set, determine a second loss value of the semantic segmentation map set and the human eye image fitting parameter set corresponding to the at least one image data. Wherein, the second loss value may include a segmentation loss value and a fitting loss value. The fitted loss value can be obtained using the regression loss function L1-Loss. The segmentation loss value can be obtained using the cross entropy loss and the Generalized Dice Loss (GDL).

In response to determining that the second loss value converges to a second predetermined threshold, use the initial image encoder, the initial image decoder, the style encoder, and the multi-layer perceptron as a trained edge-guided analyzing network.

In response to determining that the second loss value does not converge to a second predetermined threshold, adjust the network parameters of the initial image encoder, the initial image decoder, the style encoder, and the multi-layer perceptron. Use an unused image dataset to form a training image dataset. Use the adjusted initial image encoder, initial image decoder, style encoder and multi-layer perceptron as the initial image encoder, initial image decoder, style encoder and multi-layer perceptron to perform the above training steps again.

Optionally, the above performing feature fusion on the human eye image feature and the human eye contour feature corresponding respectively to each human eye image and each human eye contour map in the at least one image data, to generate fused features, may include the following steps:

The first step is to splice the human eye image feature $I(C_1 \times W_1 \times H_1)$ and the human eye contour feature $G(C_2 \times W_2 \times H_2)$ corresponding to the human eye image and the human eye contour map, by channels, to obtain a spliced feature. Wherein, $C_1$ represents the number of channels of the human eye image, $H_1$ represents the height of the human eye image, $W_1$ represents the width of the human eye image, $C_2$ represents the number of channels of the human eye contour map, $H_2$ represents the height of the human eye contour map, and $W_2$ represents the width of the human eye contour map.

Splicing is performed using the formula Q=concat(I, E). Wherein, I represents the human eye image feature, E represents the human eye contour feature, concat(,) represents the splicing function, and Q represents the spliced feature.

The second step is to input the spliced feature to a style encoder to obtain the mean and variance. Wherein, the style encoder may be a decoder capable of outputting the mean and variance of features.

The third step is to, based on the spliced feature, the mean and the variance, use the following formula to generate a fused feature:

$$\acute{E} = \text{Style}_{std} \times \frac{E - E_{mean}}{E_{std}} + \text{Style}_{mean}.$$

Wherein, É represents the fused feature, $\text{Styles}_{std}$ represents the variance, E represents the spliced feature, $E_{mean}$ represents the mean of the spliced feature, $E_{std}$ represents the variance of the spliced feature, and $\text{Style}_{mean}$ represents the mean.

Step 204, based on the semantic segmentation detection map, perform an iterative search on the initial human eye image detection fitting parameter, to determine a target human eye image detection fitting parameter.

In some embodiments, the above-mentioned executive body may, based on the semantic segmentation detection map, perform an iterative search on the initial human eye image detection fitting parameter, to determine a target human eye image detection fitting parameter.

In certain alternative implementations of some embodiments, the above performing an iterative search on the initial human eye image detection fitting parameter to determine a target human eye image detection fitting parameter based on the semantic segmentation detection map, wherein the semantic segmentation detection map may include a pupil detection area, an iris detection area, and a skin detection area, may include the following steps:

The first step is to determine the area center of gravity of the pupil detection area and the iris detection area in the semantic segmentation detection map, and obtain the pupil area gravity center and the iris area gravity center.

The second step is to, based on the pupil area gravity center, the iris area gravity center and the above-mentioned initial human eye image detection fitting parameter, perform the following parameter adjustment steps:

Determine an initial parameter adjustment step size $D_0$;

Based on the pupil area gravity center, the iris area gravity center, and the above-mentioned initial human eye image detection fitting parameter, determine a target human eye image detection fitting parameter;

Increase the number of iterations by 1, wherein the initial value of the above number of iterations is 0;

In response to determining that the number of iterations is equal to a third predetermined threshold, use the target human eye image detection fitting parameter as the target human eye image detection fitting parameter completed by the iterative search;

In response to determining that the number of iterations is less than a third predetermined threshold, make use of $D=D_0 \times R$, wherein, D represents the adjusted parameter adjustment step size, $D_0$ represents the initial parameter adjustment step size, R represents the attenuation coefficient, adjust the parameter adjustment step size, take the adjusted parameter adjustment step size as the initial parameter adjustment step size, and perform the above parameter adjustment steps again.

Optionally, the above determining the area center of gravity of the pupil detection area and the iris detection area in the semantic segmentation detection map, can obtain the pupil area gravity center and the iris area gravity center through the following formula:

$$\begin{cases} C_x = \dfrac{\sum_{i=0}^{W-1}\sum_{j=0}^{H-1} P(i,j) \times i}{\sum_{i=0}^{W-1}\sum_{j=0}^{H-1} P(i,j)} \\ C_y = \dfrac{\sum_{i=0}^{W-1}\sum_{j=0}^{H-1} P(i,j) \times j}{\sum_{i=0}^{W-1}\sum_{j=0}^{H-1} P(i,j)} \end{cases},$$

Wherein, $C_x$ represents the abscissa of the area gravity center, H represents the height of the semantic segmentation detection map, W represents the width of the semantic segmentation detection map, i represents the abscissa of the pixel, j represents the ordinate of the pixel, and $C_y$ represents the ordinate of the area gravity center, P(i, j) represents the probability that the pixel (i, j) is in the pupil detection area or the iris detection area, and P( ) represents the probability.

Optionally, the above based on the pupil area gravity center, the iris area gravity center, and the above-mentioned initial human eye image detection fitting parameter, can perform an iterative search by the following formula to determine a target human eye image detection fitting parameter:

$$\begin{cases} X_{t+1} = \{X_{t+1}^r | r \in [1,2]\} \\ X_{t+1}^r = \underset{A,B,\theta}{argmax}\, f^r(A,B,\theta'),\ A,B,\theta' = \begin{cases} (x_t^1, b, \theta), k=1 \\ (a, x_t^2, \theta), k=2 \\ (a, b, x_t^3), k=3 \end{cases} \\ x_t^k \in \{x_t^k - d^k, x_t^k, x_t^k + d^k\}, k=1,2,3 \\ f^r(A,B,\theta') = \dfrac{\sum_{i=0}^{W-1}\sum_{j=0}^{H-1} g^r(i,j,A,B,\theta') \times q^r(i,j)}{\sum_{i=0}^{W-1}\sum_{j=0}^{H-1} g^r(i,j,A,B,\theta') + q^r(i,j)} \\ q^r(i,j) = \begin{cases} 1, \text{pixels } i,j \text{ belong to area } r \\ 0, \text{pixels } i,j \text{ belong not to area } r \end{cases} \\ g^r(i,j,A,B,\theta') = \begin{cases} 1, h(i,j,A,B,\theta') \leq 0 \\ 0, h(i,j,A,B,\theta') > 0 \end{cases} \\ h(i,j,A,B,\theta') = \\ \dfrac{[(i-C_x^r)\cos\theta + (j-C_y^r)\sin\theta]^2}{a^2} + \dfrac{[(j-C_y^r)\cos\theta - (i-C_x^r)\sin\theta]^2}{b^2} - 1 \end{cases}$$

Wherein, $X_{t+1}$ represents the human eye image detection fitting parameter when the number of iteration is t+1, that is, the target human eye image detection fitting parameter, t represents the number of iteration, and the value range of t is [0, T], T represents the third predetermined threshold, X represents the human eye image detection fitting parameter, $X_{t+1}^r$ represents the target human eye image detection fitting parameter of r, r represents the detection area, and the value of r is 1 and 2, r=1 represents the pupil detection area, r=2 represents the iris detection area, $\underset{A,B,\theta}{argmax} f^r(A, B, \theta)$ means to find the value of A, B, $\theta$ when the $f^r(A, B, \theta)$ of r is maximum, that is, the degree of coincidence between the semantic segmentation detection map and the elliptic region with parameters A, B, $\theta$ characterizing the area r, $f^r(\ )$ represents the degree of coincidence between the semantic segmentation detection map and the elliptic region of the area r, A, B, $\theta$ represents the initial human eye image detection fitting parameter set after step size adjustment, $x_t^1$ represents the value of a in the initial human eye image detection fitting parameter (a, b, $\theta$) after the step size adjustment, and $x_t^2$ represents the value of b in the initial human eye image detection fitting parameter (a, b, $\theta$) after the step size adjustment, $x_t^3$ represents the value of $\theta$ in the initial human eye image detection fitting parameter (a, b, $\theta$) after the step size adjustment, $d^k$ represents the $k^{th}$ parameter adjustment step size, the value of k is 1, 2 and 3; when k=1, $d^k$ represents the parameter adjustment step size of a; when k=2, $d^k$ represents the parameter adjustment step size of b; when k=3, $d^k$ represents the parameter adjustment step size of $\theta$; H represents the height of the semantic segmentation detection map, W represents the width of the semantic segmentation detection map, i represents the abscissa of the pixel, j represents the ordinate of the pixel, $g^r(i, j, A, B, \theta)$ indicates whether the pixel (i,j) is in the elliptic region whose parameter is $(C_x^r, C_y^r, A, B, \theta)$, A indicates the long semi-axis of the ellipse, B indicates the short semi-axis of the ellipse, $\theta$ represents the rotation angle, $q^r(i, j)$ represents whether the pixel (i,j) belongs to the area r in the semantic segmentation detection map, $q^r(\ )$ represents whether the pixel belongs to the area r in the semantic segmentation detection map, h(i, j, A, B, $\theta$) represents the decision function of a relation between the pixel position and the ellipse, h( ) represents the decision function, $C_x^r$ represents the abscissa of the center of gravity of the area r, $C_y^r$ represents the ordinate of the center of gravity of the area r, cos θ represents the cosine value of θ, and sin θ represents the sine value of θ.

Step 205, send the semantic segmentation detection map and the target human eye image detection fitting parameter, as image analyzing results, to a display terminal for display.

In some embodiments, the above-mentioned executive body may send the semantic segmentation detection map and the target human eye image detection fitting parameter as image analyzing results to a display terminal for display.

The above description is only some preferred embodiments of the present disclosure and an explanation of the applied technical principles. Those skilled in the art should understand that the scope of invention involved in the embodiments of the present disclosure is not limited to the technical solutions formed by the specific combination of the above technical features, but should also cover other technical solutions formed by any combination of the above technical features or their equivalent features in the case of not departing from the above-mentioned inventive concept, for example, technical solutions formed by replacing the above features with the technical features of similar functions disclosed in (but not limited to) the embodiments of the present disclosure.

What is claimed is:

1. An edge-guided human eye image analyzing method, comprising:
    using a camera to collect a human eye image as an image to be detected, wherein the image to be detected comprises at least one of the following: a pupil area, an iris area, an upper eyelid area, and a lower eyelid area;
    inputting the image to be detected to a pre-trained contour generation network to obtain a human eye detection contour map;
    inputting the image to be detected and the human eye detection contour map to a pre-trained edge-guided analyzing network, to obtain a semantic segmentation detection map and an initial human eye image detection fitting parameter;
    based on the semantic segmentation detection map, performing an iterative search on the initial human eye image detection fitting parameter to determine a target human eye image detection fitting parameter;
    sending the semantic segmentation detection map and the target human eye image detection fitting parameter as image analyzing results to a display terminal for display.

2. The method of claim 1, wherein the pre-trained contour generation network is obtained by training in the following manner:
    obtaining a human eye dataset, wherein human eye data in the human eye dataset comprises human eye images and key contour labels corresponding to the human eye images;
    performing the following training steps based on the human eye dataset:
        inputting the human eye images included in at least one human eye data in the human eye dataset respectively to an initial contour generator, to obtain a human eye contour map corresponding to each human eye image in the at least one human eye data;
        determining a first loss value of the human eye contour map corresponding to the at least one human eye data, based on the key contour label corresponding to each human eye image in the at least one human eye data and the human eye contour map corresponding to each human eye image in the at least one human eye data;
        in response to determining that the first loss value converges to a first predetermined threshold value, using the initial contour generator as a trained initial contour generator;
        in response to determining that the first loss value does not converge to a first predetermined threshold, adjusting network parameters of the initial contour generator, and using an unused human eye dataset to form a training human eye dataset, using the adjusted initial contour generator as the initial contour generator, and performing the above training steps again.

3. The method of claim 2, wherein the key contour labels included in the human eye data in the human eye data set are obtained through the following steps:
    obtaining a semantic label map;
    performing edge detection on the semantic label map to obtain an image edge map, wherein the image edge map comprises at least one of the following: pupil edge, iris edge, upper eyelid edge and lower eyelid edge;
    performing Gaussian smoothing on at least one item included in the image edge map: the pupil edge, the iris edge, the upper eyelid edge and the lower eyelid edge, to generate a key edge map as a key contour label.

4. The method of claim 3, wherein the first loss value of the human eye contour map corresponding to the at least one human eye data comprises: a loss value of the contour generator and a loss value of a contour discriminator; and
    the determining a first loss value of the human eye contour map corresponding to the at least one human eye data based on the key contour label corresponding to each human eye image in the at least one human eye data and the human eye contour map corresponding to each human eye image in the at least one human eye data, comprises:
    inputting the human eye contour map corresponding to the human eye image included in the at least one human eye data to a initial contour discriminator respectively, to obtain a first confidence value of each human eye contour map corresponding to the at least one human eye data;
    inputting the key contour label corresponding to the human eye image included in the at least one human eye data to the initial contour discriminator respectively, to obtain a second confidence value of each key contour label corresponding to the at least one human eye data;
    based on the key contour label corresponding to each human eye image in the above at least one human eye data, the human eye contour map corresponding to each human eye image in the at least one human eye data, and the first confidence value of each human eye contour map in the at least one human eye data and the second confidence value of each key contour label corresponding to the at least one human eye data, using the following formula to obtain the first loss value:

$$\begin{cases} L_G(\varepsilon) = \alpha \times \sum U(\hat{E}_i, E_i) + \beta \times \sum (D_\varepsilon(\hat{E}_i)) - 1 \\ L_S(\varepsilon) = \sum (D_\varepsilon(E_i) - 1)^2 + \sum (D_\varepsilon(\hat{E}_i))^2 \end{cases},$$

wherein, $L_G(\varepsilon)$ represents the loss value of the contour generator with respect to $\varepsilon$, $L_G( )$ represents the loss value of the contour generator, $\varepsilon$ represents a parameter, $\alpha$ represents a first hyperparameter, $\Sigma$ represents a summation, $U(\hat{E}_i, E_i)$ represents a function to find a difference between a $i^{th}$ human eye contour map and a $i^{th}$ key contour label, $U( )$ represents a function to find the difference, i represents a serial number, $\hat{E}_i$ represents the $i^{th}$ human eye contour map, and $\hat{E}$ represents at least one human eye contour map, $E_i$ represents the $i^{th}$ key contour label, E represents at least one key contour label, $\beta$ represents a second hyperparameter, $D_\varepsilon(\hat{E}_i)$ represents the first confidence value of $\hat{E}_i$, $L_S(\varepsilon)$ represents the loss value of the contour discriminator with respect to $\varepsilon$, $L_S( )$ represents the loss value of the contour discriminator, and $D_\varepsilon(E_i)$ represents the second confidence value of $E_i$.

5. The method of claim 4, wherein the pre-trained edge-guided analyzing network comprises: an initial image encoder, an initial image decoder, a style encoder, and a multi-layer perceptron, the pre-trained edge-guided analyzing network is obtained by training in the following ways:

obtaining an image dataset, wherein the image data in the image dataset comprises a human eye image, a human eye contour map, and a semantic segmentation map label and a human eye image fitting parameter label corresponding respectively to the human eye image and the human eye contour map, and wherein the human eye contour map included in the image data in the image dataset is a human eye contour map output by the pre-trained contour generation network;

performing the following training steps based on the image dataset:

inputting the human eye image and the human eye contour map included in the at least one image data in the image dataset to the initial image encoder respectively, to obtain an eye image feature and a human eye contour feature corresponding respectively to each human eye image and each human eye contour map in the at least one image data;

performing feature fusion on the human eye image feature and the human eye contour feature corresponding respectively to each human eye image and each human eye contour map in the at least one image data, to generate fused features, and obtain a fused feature set;

inputting each fused feature in the fused feature set to the initial image decoder to obtain a semantic segmentation map set, wherein the semantic segmentation map in the semantic segmentation map set comprises the pupil area, the iris area and a skin area;

inputting each fused feature in the fused feature set to the multi-layer perceptron to obtain a human eye image fitting parameter set;

based on the semantic segmentation map label and the human eye image fitting parameter label corresponding to each human eye image and each human eye contour map respectively in the at least one image data, and the semantic segmentation map set and the human eye image fitting parameter set, determining a second loss value of the semantic segmentation map set and the human eye image fitting parameter set corresponding to the at least one image data;

in response to determining that the second loss value converges to a second predetermined threshold, using the initial image encoder, the initial image decoder, the style encoder, and the multi-layer perceptron as the trained edge-guided analyzing network;

in response to determining that the second loss value does not converge to a second predetermined threshold, adjusting network parameters of the initial image encoder, the initial image decoder, the style encoder, and the multi-layer perceptron, and using an unused image dataset to form a training image dataset, using the adjusted initial image encoder, initial image decoder, style encoder and multi-layer perceptron as the initial image encoder, initial image decoder, style encoder and multi-layer perceptron to perform the above training steps again.

6. The method of claim 5, wherein the performing feature fusion on the human eye image feature and the human eye contour feature corresponding respectively to each human eye image and each human eye contour map in the at least one image data to generate fused features, comprises:

splicing the human eye image feature and the human eye contour feature corresponding to the human eye image and the human eye contour map, by channels, to obtain a spliced feature;

inputting the spliced feature to a style encoder to obtain a mean and a variance;

based on the spliced feature, the mean and the variance, using the following formula to generate a fused feature:

$$\acute{E} = \text{Style}_{std} \times \frac{E - E_{mean}}{E_{std}} + \text{Style}_{mean},$$

wherein, $\acute{E}$ represents the fused features, $\text{Style}_{std}$ represents the variance, E represents the spliced feature, $E_{mean}$ represents the mean of the spliced feature, $E_{std}$ represents the variance of the spliced feature, and $\text{Style}_{mean}$ represents the mean.

7. The method of claim 6, wherein the semantic segmentation detection map includes a pupil detection area, an iris detection area, and a skin detection area; and based on the semantic segmentation detection map, performing an iterative search on the initial human eye image detection fitting parameter to determine a target human eye image detection fitting parameter, comprises:

determining an area gravity center of the pupil detection area and the iris detection area in the semantic segmentation detection map, to obtain a pupil area gravity center and an iris area gravity center;

based on the pupil area gravity center, the iris area gravity center and the initial human eye image detection fitting parameter, performing the following parameter adjustment steps:

determining an initial parameter adjustment step size $D_0$;

based on the pupil area gravity center, the iris area gravity center, and the initial human eye image detection fitting parameter, determining the target human eye image detection fitting parameter;

increasing a number of iterations by 1, wherein initial value of the number of iterations is 0;

in response to determining that the number of iterations is equal to a third predetermined threshold, using the target human eye image detection fitting parameter as the target human eye image detection fitting parameter completed by the iterative search;

in response to determining that the number of iterations is less than the third predetermined threshold, making use of $D=D_0 \times R$, wherein, D represents the adjusted parameter adjustment step size, $D_0$ represents the initial parameter adjustment step size, R represents an attenuation coefficient, adjusting the parameter adjustment step size, taking the adjusted parameter adjustment step size as the initial parameter adjustment step size, and performing the above parameter adjustment steps again.

8. The method of claim 7, wherein the determining the area gravity center of the pupil detection area and the iris detection area in the semantic segmentation detection map to obtain the pupil area gravity center and the iris area gravity center, comprises:

$$\begin{cases} C_x = \dfrac{\sum_{i=0}^{W-1}\sum_{j=0}^{H-1} P(i,j) \times i}{\sum_{i=0}^{W-1}\sum_{j=0}^{H-1} P(i,j)} \\ C_y = \dfrac{\sum_{i=0}^{W-1}\sum_{j=0}^{H-1} P(i,j) \times j}{\sum_{i=0}^{W-1}\sum_{j=0}^{H-1} P(i,j)} \end{cases},$$

wherein, $C_x$ represents abscissa of the area gravity center, H represents a height of the semantic segmentation detection map, W represents a width of the semantic segmentation detection map, i represents abscissa of a pixel, j represents ordinate of the pixel, and $C_y$ represents ordinate of the area gravity center, P(i, j) represents a probability that the pixel (i, j) is in the pupil detection area or the iris detection area, and P( ) represents the probability.

9. The method of claim 8, wherein the determining a target human eye image detection fitting parameter based on the pupil area gravity center, the iris area gravity center, and the above-mentioned initial human eye image detection fitting parameter, comprises:

based on the pupil area gravity center, the iris area gravity center, and the initial human eye image detection fitting parameter, performing the iterative search by the following formula to determine the target human eye image detection fitting parameter:

$$\begin{cases} X_{t+1} = \{X_{t+1}^r | r \in [1, 2]\} \\ X_{t+1}^r = \underset{A,B,\theta}{argmax}\, f^r\!\left(A, B, \acute{\theta}\right),\; A, B, \acute{\theta} = \begin{cases} (x_t^1, b, \theta), k=1 \\ (a, x_t^2, \theta), k=2 \\ (a, b, x_t^3), k=3 \end{cases} \\ x_t^k \in \{x_t^k - d^k, x_t^k, x_t^k + d^k\}, k=1,2,3 \\ f^r\!\left(A, B, \acute{\theta}\right) = \dfrac{\sum_{i=0}^{W-1}\sum_{j=0}^{H-1} g^r\!\left(i, j, A, B, \acute{\theta}\right) \times q^r(i,j)}{\sum_{i=0}^{W-1}\sum_{j=0}^{H-1} g^r\!\left(i, j, A, B, \acute{\theta}\right) + q^r(i,j)} \\ q^r(i,j) = \begin{cases} 1, \text{pixels } i, j \text{ belong to area } r \\ 0, \text{pixels } i, j \text{ belong not to area } r \end{cases} \\ g^r\!\left(i, j, A, B, \acute{\theta}\right) = \begin{cases} 1, h\!\left(i, j, A, B, \acute{\theta}\right) \le 0 \\ 0, h\!\left(i, j, A, B, \acute{\theta}\right) > 0 \end{cases} \\ h\!\left(i, j, A, B, \acute{\theta}\right) = \\ \dfrac{\left[(i-C_x^r)\cos\acute{\theta} + (j-C_y^r)\sin\acute{\theta}\right]^2}{a^2} + \dfrac{\left[(j-C_y^r)\cos\acute{\theta} - (i-C_x^r)\sin\acute{\theta}\right]^2}{b^2} - 1 \end{cases}$$

wherein, $X_{t+1}$ represents the human eye image detection fitting parameter when the number of iteration is t+1, that is, the target human eye image detection fitting parameter, t represents the number of iteration, and a value range of t is [0, T], T represents the third predetermined threshold, X represents the human eye image detection fitting parameter, $X_{t+1}^r$ represents the target human eye image detection fitting parameter of r, r represents the detection area, and a value of r is 1 and 2, r=1 represents the pupil detection area, r=2 represents the iris detection area, $\underset{A,B,\acute{\theta}}{argmax} f^r(A, B, \acute{\theta})$ means to find values of A, B, $\acute{\theta}$ when the $f^r(A, B, \acute{\theta})$ of r is maximum, that is, a degree of coincidence between the semantic segmentation detection map and an elliptical region with parameters A, B, $\acute{\theta}$ characterizing the area r, $f^r(\ )$ represents the degree of coincidence between the semantic segmentation detection map and the elliptic region of the area r, A, B, $\acute{\theta}$ represents the initial human eye image detection fitting parameter set after step size adjustment, $x_t^1$ represents the value of a in the initial human eye image detection fitting parameter (a, b, θ) after the step size adjustment, and $x_t^2$ represents the value of b in the initial human eye image detection fitting parameter (a, b, θ) after the step size adjustment, $x_t^3$ represents the value of θ in the initial human eye image detection fitting parameter (a, b, θ) after the step size adjustment, $d^k$ represents a $k^{th}$ parameter adjustment step size, a value of k is 1, 2 and 3; when k=1, $d^k$ represents the parameter adjustment step size of a; when k=2, $d^k$ represents the parameter adjustment step size of b; when k=3, $d^k$ represents the parameter adjustment step size of θ; H represents the height of the semantic segmentation detection map, W represents the width of the semantic segmentation detection map, i represents the abscissa of the pixel, j represents the ordinate of the pixel, $g^r(i, j, A, B, \acute{\theta})$ indicates whether the pixel (i,j) is in the elliptic region whose parameter is ($C_x^r, C_y^r$, A, B, $\acute{\theta}$), A indicates along semi-axis of the ellipse, B indicates a short semi-axis of the ellipse, $\acute{\theta}$ represents a rotation angle, $q^r(i, j)$ represents whether the pixel (i,j) belongs to the area r in the semantic segmentation detection map, $q^r(\ )$ represents whether the pixel belongs to the area r in the semantic segmentation detection map, $h(i, j, A, B, \theta)$ represents a decision function of a relation between the pixel position and the ellipse, $h(\ )$ represents the decision function, $C_x^r$ represents abscissa of the center of gravity of the area r, $C_y^r$ represents ordinate of the center of gravity of the area r, $\cos \theta$ represents a cosine value of $\theta$, and $\sin \theta$ represents a sine value of $\theta$.

10. The claim of claim 9, wherein the initial contour generator uses a bidirectional cascaded convolutional neural network, the bidirectional cascaded convolutional neural network including a plurality of convolutional neural networks, each convolutional neural network performing one-scale contour extraction on the image, and contours of different scales of the images extracted by multiple convolutional neural networks are fused to serve as the human eye contour map; the initial contour discriminator uses the convolutional neural network, and the human eye contour map is subjected to multiple convolution, pooling, and activation operations to generate a discriminant result.

\* \* \* \* \*